United States Patent [19]

Schmidtchen

[11] Patent Number: 4,613,166
[45] Date of Patent: Sep. 23, 1986

[54] CONNECTING CONCENTRIC TUBE SYSTEMS

[75] Inventor: Hans-Martin Schmidtchen, Osnabrueck, Fed. Rep. of Germany

[73] Assignee: Kabel- und Metallwerke Gutehoffnungshuette, Hanover, Fed. Rep. of Germany

[21] Appl. No.: 630,774

[22] Filed: Jul. 13, 1984

[30] Foreign Application Priority Data

Jul. 16, 1983 [DE] Fed. Rep. of Germany ....... 3325757

[51] Int. Cl.⁴ .............................................. F16L 11/12
[52] U.S. Cl. ........................................ 285/53; 285/48; 285/177; 285/138; 285/149; 285/417; 174/88 C
[58] Field of Search ...................... 285/53, 54, 48, 47, 285/177, 417, 138, 149; 174/85, 88 C, 84 R

[56] References Cited

U.S. PATENT DOCUMENTS

| 528,291 | 10/1894 | Cummings | 285/47 |
| 582,910 | 5/1897 | Groshans | 285/374 X |
| 1,731,171 | 10/1929 | Miller | 285/138 |

FOREIGN PATENT DOCUMENTS 108359 1/1925 Switzerland ...................... 174/88 C Primary Examiner—Richard J. Scanlan, Jr.
Attorney, Agent, or Firm—Ralf H. Siegemund

[57] ABSTRACT

Two tube systems, each comprised of two or more concentrically arranged metal tubes, are positively and electrically conductive interconnected through a coupler sleeve system composed of a corresponding number of concentrically arranged coupler sleeves of slightly larger diameter such that ends of the sleeves of the coupler sleeves are threaded upon ends of the tubes of the tube systems to be interconnected.

7 Claims, 3 Drawing Figures

CONNECTING CONCENTRIC TUBE SYSTEMS

BACKGROUND OF THE INVENTION

The present invention relates to connecting electrically and, positively mechanically, two tube systems to each other, each system being comprised of at least two concentric metal tubes separated by a synthetic layer. And more particularly the invention relates to interconnecting two tube systems to be used for the power supply of electrically driven underwater pumps.

It has been suggested to provide underwater pumps with electrical energy as well as with a coolant and lubricant through a conduit system which is comprised of three concentric tubes. These tubes are made of metal, but are insulated electrically with respect to each other. These three concentric tubes provide for conduction of electrical voltage and current of a three phase system so as to supply an underwater pump with three phase electric power and energy. The interior of the innermost tube serves as duct for the coolant and lubricant. Such a three tube conduit is disposed inside a somewhat larger tube, and the annular space between the three phase tube system and the last mentioned larger tube serves as return path for the coolant and lubricant. Basically, such a system is a rigid one, and the components, so to speak, are transported at finite length to an installation site where they have to be interconnected.

The connection must meet very high and stringent requirements. First of all, there must be positive connection between the individual tubes so that from a mechanical point of view they constitute a unit. Moreover, it is necessary that the electrical connection between tubes of similar diameter, i.e., similar relative disposition within the system is established positively with no appreciable electrical resistance being effective across the joint. Of course it has to be prevented that the joint in between two such tube systems can become for some reason or another a source for a short circuit. On the other hand, the interconnection of two tube systems must not be a permanent one. Rather, the connection has to be fairly easily releasable, because in the case of a defect, for example of the underwater pump, the pump has to hauled to the surface, which of course means that one has to retract the supply line. Since, as stated, the supply line is a rigid one, the individual sections have to be disconnected. On the other hand, connecting and reconnecting such tube sections to each other should not be a complicated affair, but be effected rather easy.

DESCRIPTION OF THE INVENTION

It is an object of the present invention to, basically, fulfill the requirements and to satisfy the demands and conditions as set forth in the preceding chapter. To the best of our knowledge these demands and requirements have not yet been satisfactorily met.

Therefore, it is an object of the present invention to provide a new and improved positive and electrically conductive connection between two tube systems, each being comprised of two or more concentric metal tubes with insulation of a synthetic material being disposed in between, particularly for purposes of providing a relatively long supply line for electrically driven underwater pumps, the supply line providing both electric power and lubricant-coolant.

In accordance with the preferred embodiment of the present invention, the demands and requirements of the objects and, here particularly, of the specific objects can be satisfied by providing the metal tubes to be interconnected with an outer threading, at least at the ends, whereby the respective outer threadings are offset with respect to threadings on more inner ones of the tubes, and similarly constructed coupler sleeves are provided, which, however, have a slightly larger diameter, there being accordingly, a set of such coupling sleeves, the ends of which being provided with internal threading at an axially staggering of the threading commensurate with the staggering of the outer threadings of a tube system to which this set of sleeves is to be connected. The set of sleeves therefore is connected with its two ends in a threaded fashion to the tubes of the tube system to be interconnected, whereby the threads are similar with regard to pitch and beginning.

The inventive method using the set of sleeves as stated, provides positive mechanical connection as between commensurate tubes of the tube systems to be interconnected, and the threaded connection ensures also positive electric contact across the joint. Electric current of course will run through the respective sleeves which have to be electrically separated from each other accordingly. It is essential that the tubes of the systems, as well as the sleeves of the sleeve system, are in effect positively connected through the synthetic layer so that upon turning, for example, the outer one of the sleeves in an assembly, all sleeves will follow that rotation because it is only the outer one which is accessible, for example, to the application of a threading tool. In other words, upon threading the outer sleeve upon one or the other or both of the outer tubes of the two tube systems to be interconnected, the respective inner sleeve will also be threaded onto the respective inner tubes in each of the concentric tube systems, but the tubes in each system, as well as the sleeves must not rotate relative to each other.

Usually, a supply line of the nature to which the invention pertains is disposed and installed in free suspension. This ensures that the threads provide a sufficiently large engagement surface, and due to the multiple threads involved in effecting each individual threading connection, positive electric contact is ensured.

In the preferred form, the threads are rolled into or onto the free ends of the metal tubes of this tube systems. Rolled threads have the advantage that they are susceptible to mechanical wear to a significantly smaller degree than cut threads. Moreover, the conventional copper tube systems as they are used can very easily be threaded by rolling in this fashion.

In order to carry out the inventive method, one needs a particular coupler fitting or sleeve assembly. The overall length of such a sleeve assembly should be at least six times the length of the threads taken in longitudinal axial direction and for three concentric metal tubes to be interconnected. In the case of a larger number of concentric metal tubes in any of the tube systems, the sleeve length should be appropriately larger. Preferably, the coupled sleeve has actually the same overall length as the length of any of the tube systems. Since the period of time for threading a sleeve, or sleeve system, onto the ends of tube systems to be interconnected is independent from the length of the sleeve, it is of advantage to use relatively long sleeve systems so that the number of threadings is reduced, which in turn reduces the time needed in a relatively large system for effecting all of the requisite connections. Essentially this means that the sleeves or sleeve systems could have about equal length to the lengths of the tube assemblies to be interconnected. This in turn means that one can view the line as alternating between tube systems having smaller and tube systems having larger diameter commensurate with the threading and engagement requirements.

In accordance with a different approach, it is suggested to proceed differently; one provides certain lengths of a concentric tube system of the type described receives already at the manufacturing site with relatively short set of coupler sleeves. The coupler sleeves may be threaded onto the tube ends of a system as stated, but, for example, through shrinking and soldering additional connection may be made. This means that at the installation site, one has available concentric tube systems, each having on one end staggeredly arranged threads as described, which at the other end the various tubes of the system proper carry already threaded-on sleeves of a coupler sleeve system having, so to speak, at its open end inwardly arranged threads so that the final installations involves only the threading of such fixed sleeve system to the end of another length of tubing assembly, namely, at the end thereof, which does not carry a sleeve assembly. This in fact will increase the speed of installation with the added advantage that at the installation site one has to deal with only one brand or kind of tube assemblies, namely, an assembly with outer threading on one end and a threaded on sleeve assembly on the other end. This in turn offers the additional advantage that the threads of the sleeved ends are better protected.

It was found to be of advantage that the wall thickness of the metal tubings making up the coupler sleeve system is smaller than the wall thickness of the metal tubes in the systems to be interconnected, such that the overall area cross section of a sleeve to be connected to a tube is the same as the cross section of that tube. It has to be observed that the diameter of the sleeve is slightly larger, and if the wall thickness is a little reduced, sleeve and tube cross sections are equalized. This has the advantage of a more uniform electrical resistance all along the assembled string. This will require the insulation in between two concentric sleeves to be correspondingly thicker. It may appear on the surface as if equal wall thicknesses simply means that the electrical resistance of a sleeve is reduced as compared with the resistance per unit length of a tube to be connected to such a sleeve. However, if copper is used, one does not employ unnecessary large cross sections for electrical conductions, simply because copper is very expensive. Moreover, reducing the wall thickness of the sleeves does not only save copper, but reduces the weight of a sleeve assembly as well.

For better ensuring the transmission of forces from sleeve to tube and vice-versa, and for obtaining a uniform electric resistance along the string of tubing, it is of advantage to make the length of the thread in axial direction at least as large as the radius of the smallest metal tube in the system.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Figure 1:
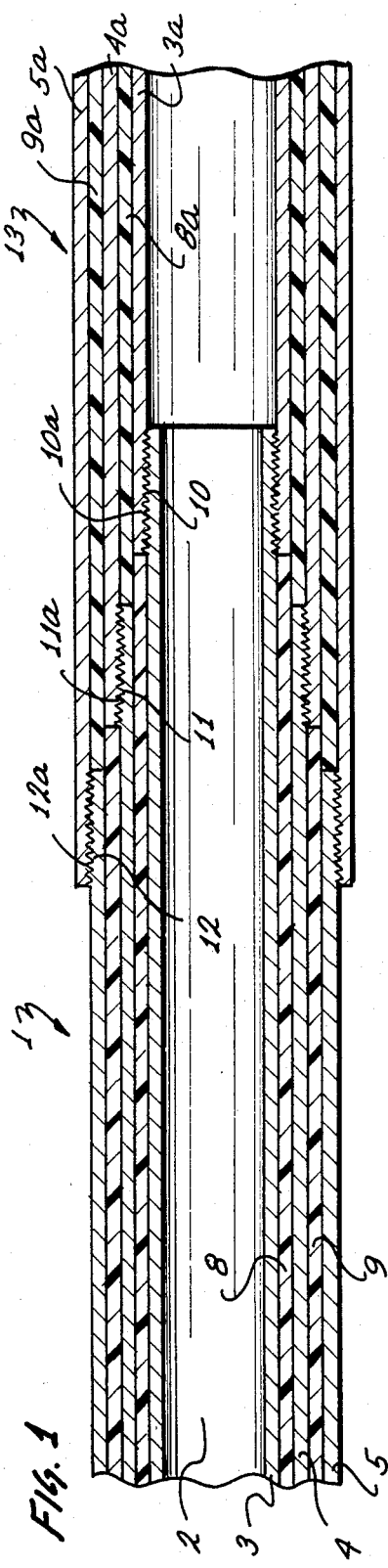
FIG. 1 illustrates somewhat schematically a cross-section through a portion of an improved tube assembly connecting device in accordance with the present invention for practicing the best mode thereof.

Proceeding to the detailed description of the drawings, reference numeral 1 refers to one tube system being comprised of three concentric copper tubes 3, 4 and 5. The interior of tube 2 serves as a duct and flow space for lubricant and coolant material. It is assumed moreover that an underwater pump is connected to that string of tubing at one particular point. Synthetic layers 8 and 9 preferably being made of polyethylene cause the tubes 3, 4 and 5 to be spaced and electrically insulated with respect to each other.

As stated, the copper tubes 3, 4 and 5 serve as transmission lines for the three phases of a three-phase voltage system. This way an underwater pump can be supplied with electrical energy. The copper tubes 3, 4 and 5, as well as the polyethylene layers 8 and 9, are positively interconnected so that, for example, in a vertical arrangement these tubes 3, 4 and 5 will not rotate with respect to each other. Tubes 3, 4 and 5 are preferably seamlessly drawn copper tubes. A preferred mode of making such an assembly is disclosed and suggested in a co-pending application Ser. No. 625,447 by me and another of common assignee.

In addition, the figure shows three concentric sleeves, 3a, 4a and 5a of a sleeve system 13. These sleeves are made of copper and are separated from each other through insulation 8a and 9a. One can think of the assembly 3a, 4a and 5a with interposed insulation as being a slightly radially larger replica of the tube system with tubes 3, 4 and 5. And the length of the sleeve system 13 may be smaller or even as large as the length of the system 1.

In order to provide a positive and electrically conductive connection in between two tube systems of the type of tube system 1, such a tube system will be prepared as follows: The tube 4 must axially offset with respect to tube 3, and the tube 5 in turn is axially offset with respect to tube 4. A respective portion of the thus radially exposed portions of the tubes 3 and 4, as well as the end portion of the tube 5, each are provided with threadings 10, 11 and 12, whereby the pitch of the threads is the same. Also, the beginning of the thread in each instance is at the same peripheral location.

The coupler sleeve assembly 13 has, as stated, the three sleeve elements, 3a, 4a, and 5a, but their axial staggering relation is reversed. The tube, or sleeve 4a, is axially recessed with respect to the end of tube or sleeve 5a, and the tube or sleeve 3a is axially recessed in tube or sleeve 4a. The thus radially inwardly exposed portions of tubes 5a and 4a, as well as the axial end of the tube 3a, are provided with threadings 12a, 11a, and 10a, respectively, and they have not only the same pitch among each other, but they have the same pitch as the threads 10, 11, and 12. Also, the beginning of the thread in each instance of the sleeve assembly is in the same azimuthal location.

It can readily be seen that the sleeve assembly 13 is of a symmetric nature, i.e., it has threaded and offset ends at the other end, which is to the right of the drawing, and is a direct symmetric replica of the illustrated portion. In order to connect the coupler sleeves 13 with the conduit and tube system 1, the sleeve system is turned with application of torque being provided at the outer tube 5a, whereby the tube 3a with its thread 10a is threaded onto the thread 10 of the tube 3; the tube or sleeve 4a with its thread 11a is threaded onto the thread 11 of the tube 4, and the tube or sleeve 5a, with its thread 12a, is threaded onto the thread 12 of the tube 5.

Figure 2:
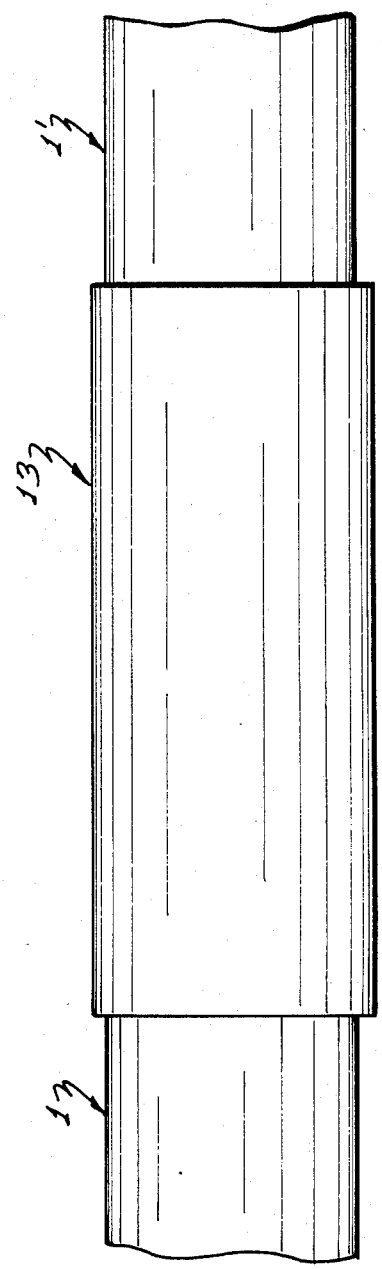
FIG. 2 is a schematic side view of a completed connection between two strings of tubing.

The right-hand portion of the sleeve system 13 is analogously threaded onto the end of a tube assembly such as 1' of FIG. 2 similar to tube assembly 1. In this case, it may be necessary to provide threading rotation onto that additional tube system; because the tube system 1 illustrated may already be installed, and once sleeve sytem 13 is threaded onto the illustrated tube it can no longer be rotated while an additional tube system such as 1' is not yet installed and can therefore be rotated and threaded onto the sleeve system 13, from the right-hand portion in the drawing.

In order to provide for practical assembly techniques, the individual lengths 1 may approximately be equal to the length of a sleeve 13. Length is limited to about 6 meters if tube or tube portions are rigid. As stated, the wall thickness of the tubes or sleeves 3a, 4a, and 5a should be slightly smaller than the thickness of the tubes 3, 4 and 5 because the sleeves or tubes 3a, 4a, 5a have slightly larger diameter, but, for purposes of uniformity of electric resistance, it is advisable to provide the cross sections of the tubes comparable, i.e., the cross section of the tube 5 should have the same area as the cross section of tube 5a, etc. Aside from a greater uniformity in electrical resistance along the string of tubing, one avoids any problem that may result if a relatively long sleeve assembly 13 is heavier than any of the tube assemblies, such as 1. Equalizing the cross sections in fact equalizes the weight. Moreover, rating of the cross sections as stated permits saving in copper.

As stated, it was found to be of advantage to roll the threads 10, 11 and 12, as well as 10a, 11a and 12a, into the walls of the respective tubes and sleeves. It may be of further advantage in this regard to provide at least some tubes with threading over the entire length, because it may be simpler to thread an entire tube rather than only a section thereof. Moreover, such threading may offer the advantage that the synthetic layers 8, 9, and 8a and 9a, are better bonded and connected to the respective adjoining tubing.

Figure 3:
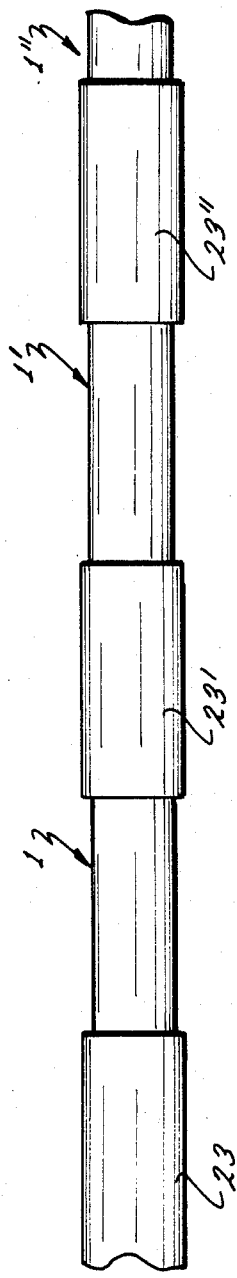
FIG. 3 is a conduit and conductor system construction in accordance with the principles of the present invention.

As stated, a sleeve 13 may have approximately the same length as any of the sections 1, i.e., for example, 6 meters, a method for each of them can be employed as mentioned above and as disclosed in the aforementioned co-pending application Ser. No. 625,447. Such an arrangement of alternating wider and narrower tube systems is illustrated in particular in FIG. 3, wherein reference numeral 1, 1', 1" etc., refers to smaller diameter tube sections, and the wider sections 23, 23', 23", etc., alternate between the sections of smaller diameter. Broadly speaking, all sections are at least approximately of equal length. In case the coupler sleeve assemblies are shorter, one may still provide assembly of tubing as described in the aforementioned application, and simply shorter lengths are cut, the sleeves are then axially offset, and the threads rolled wherever necessary.

Alternatively, it is possible to simply use metal sleeves 3a, 4a and 5a, and to slide them into each other, maintaining concentricity and axial spacing and to fill the annular space with a casting resin or any other suitable synthetic. One will preferably provide the threads 10a, 11a and 12a beforehand. This kind of method may be more practical in case of shorter coupler sleeves length. The shorter coupler sleeves will then, for example, be threaded onto the end of a tube system, just as shown in FIG. 1, and then positively connected thereto, for example, through shrinking, soldering, or the like.

The invention is not limited to the embodiments described above, but all changes and modifications thereof not constituting departures from the spirit and scope of the invention, are intended to be included.

I claim:

1. A joint between two concentric tube systems being comprised of at least two concentric metal tubes with interposed synthetic insulation, comprising:

the respective outer one of tubes being axially offset with respect to an inner one, the inner one, as well as the outer one, having their ends threaded with equal pitch, the threadings being axially offset accordingly;

a coupler sleeve assembly having correspondingly at least two concentrically arranged individual sleeves of slightly larger diameter than tubes of the tube systems, and being positively interconnected by an insulation layer, and being axially inwardly staggered so that respective outer sleeves project axially beyond respective inner sleeves, the sleeves being provided at their exposed ends and on their inside with threading of equal pitch being the same pitch as said threadings of said tube systems; and the threadings of the sleeves of the coupler being threaded onto the tubes of the tube systems one and each so that any sleeve of the sleeve system threadedly interconnects to respective tubes of the two tube systems.

2. A joint as in claim 1 wherein at least some of the threads have been obtained through rolling.

3. A joint as in claim 1 wherein the wall thickness of a sleeve of said sleeves is slightly smaller than each of the wall thickness of the two tubes it threadedly interconnects so that the cross sections of that sleeve and of these two tubes are similar.

4. A joint as in claim 1 wherein each of the threads have an axial length which is at least equal or exceeds the radius of the smallest one of the tubes in any of the tube systems.

5. A tubing system comprised of sections, each section including at least two concentrically arranged and insulated tubes wherein alternating sections have tubes of different diameters such that the tubes of a larger diameter section has its ends threaded upon ends of tubes of smaller diameter of adjoining sections, whereby a section having larger diameter tubes has its tubes axially projecting beyond respective inner ones of the same section, and a section of smaller diameter tubes has its more inwardly placed tubes projecting axially beyond more outer ones of the same section.

6. A coupler for interconnecting concentric tube sections, the coupler being comprised of a plurality of concentrically arranged sleeves wherein outer ones project at both ends axially beyond inner ones, and respective exposed end portions, as well as the end portion of the innermost of the coupler sleeves, being provided with the same pitch threading, there being electrically insulating layers interposed between adjoining coupler sleeves.

7. A coupler as in claim 6 wherein the sleeves are mechanically held together and spaced from each other through a synthetic layer.

* * * * *